United States Patent
Miyahara et al.

(10) Patent No.: US 6,711,449 B1
(45) Date of Patent: Mar. 23, 2004

(54) ORDERED PRODUCT DELIVERY DATE MANAGEMENT SYSTEM FOR MANAGEMENT PRODUCT OR PART PRODUCTION SLOT EXCHANGE

(75) Inventors: Shunji Miyahara, Toyota (JP); Akira Ishizaki, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 439 days.

(21) Appl. No.: 09/592,844

(22) Filed: Jun. 13, 2000

(51) Int. Cl.[7] .............................................. G06F 19/00
(52) U.S. Cl. ........................... 700/100; 700/101; 705/8
(58) Field of Search ................... 700/97, 99, 100–107, 700/117, 121; 705/7, 8, 29

(56) References Cited

U.S. PATENT DOCUMENTS

| | | | |
|---|---|---|---|
| 4,937,743 A | * 6/1990 | Rassman et al. | 364/401 |
| 5,040,123 A | * 8/1991 | Barber et al. | 364/468 |
| 5,093,794 A | * 3/1992 | Howie et al. | 364/468 |
| 5,212,791 A | * 5/1993 | Damian et al. | 395/650 |
| 5,233,533 A | * 8/1993 | Edstrom et al. | 364/468 |
| 5,787,000 A | * 7/1998 | Lilly et al. | 364/468.01 |
| 5,890,134 A | * 3/1999 | Fox | 705/9 |
| 6,078,912 A | * 6/2000 | Buerger et al. | 707/1 |
| 2002/0007293 A1 | * 1/2002 | Clemens et al. | 705/7 |
| 2002/0107600 A1 | * 8/2002 | Crampton et al. | 700/100 |

FOREIGN PATENT DOCUMENTS

| | | |
|---|---|---|
| JP | 3-136756 | 5/1991 |
| JP | 04145573 A | 5/1992 |
| JP | 05012305 A | 1/1993 |
| JP | 06044259 A | 2/1994 |
| JP | 06214996 A | 8/1994 |
| JP | 07192044 A | 7/1995 |
| JP | 07282140 A | 10/1995 |
| JP | 07314297 A | 12/1995 |
| JP | 11126221 A | 5/1999 |
| JP | 2988472 | 2/2000 |
| JP | 2000-05220 | * 2/2000 |
| JP | 2000-035807 | 2/2000 |

* cited by examiner

*Primary Examiner*—Leo Picard
*Assistant Examiner*—Sean Shechtman
(74) *Attorney, Agent, or Firm*—Burns, Doane, Swecker & Mathis, LLP

(57) ABSTRACT

When content of a production slot database indicates that there is no free production slot which can be allocated to an ordered vehicle designated in received order information, a production management section exchanges a production slot assigned to a potential vehicle so that the ordered vehicle can be delivered by the desired date. When no potential vehicle slot is available, a production slot for an ordered vehicle can be exchanged with that for another ordered vehicle for which a production slot has been secured, and the production slot date of the other vehicle is postponed to another day before the desired delivery date. When a production slot is secured before the desired delivery date but the production slot for a part required for producing the ordered vehicle cannot be secured, management of exchange is performed for the part according to a parts production slot database to enable delivery of as many vehicles by the delivery dates desired by customers as possible.

4 Claims, 9 Drawing Sheets

DEALER A      RECEPTION OF ORDER      12:00, JULY 1, 1998

VEHICLE [A ▶]     [ORDERD VEHICLE]

| ENGINE/TRANSMISSION | GRADE | BODY COLOR | OPTIONS |
|---|---|---|---|
| 3000EFI24ECT-i | RS G GPS | SUPER WHITE | ALUMINUM WHEELS |
| 2500EFI24ECT-i | RS G EMV | SILVER METALLIC | SPARE TIRE |
| 2000EFI24ECT | RS G | DARK GRAY METALLIC | TRC |
| 2000EFI24 5MT | RS FOUR | BLACK | POWER MOONROOF |
| 2400EFI TD ECT | RS | LIGHT OLIVE METALLIC | REAR FOG LAMP |
| 2400EFI TD 5MT | RT | SILKY SHINE TONING | GPS VOICE NAVIGATION |
|  | RE | DARK BLUE MICA | COLD DISTRICT SPECIFICATIONS |
|  |  |  | SNOWY DISTRICT SPECIFICATIONS |
|  |  |  | EMV |

┌─ FORM ─────────────┐    ┌─ TYPE ──────────────────────────┐
│ ☑ ORDERD VEHICLE   │    │ ☑ SCHEDULE-        ☐ DELIVERY DATE- │
│                    │    │   DESIGNATED VEHICLE   DESIRED VEHICLE │
│ ☐ POTENTIAL VEHICLE│    │   DESIRED DELIVERY DATE [◀ JULY ▶] [◀ 7 ▶] TH │
└────────────────────┘    │ ☐ ASAP VEHICLE     ☐ CHANGE     │
                                                                │ ☐ ORDINARY        ☐ CANCEL     │
                                                                └─────────────────────────────────┘

[RETRIEVAL OF VEHICLES IN STOCK]

[RESPONSE OF DELIVERY DATE]     [END]

Fig. 3

DEALER A        12:01, JULY 1, 1998

RESPONSE OF DELIVERY DATE         ORDERED VEHICLE

FOR THE ORDER FROM MR. TARO YAMADA, THE DELIVERY DATE IS JULY 7TH (TUE.).

VEHICLE: A
ENGINE/TRANSMISSION: 2500EFI 24 ECT-i
MODEL: RS G
BODY COLOR: SILVER METALLIC
OPTIONS:
- ALUMINUM WHEELS
- SPARE TIRE
- REAR FOG LAMPS
- COLD DISTRICT SPECIFICATIONS
- EMV

ORDER        CANCEL

12:01, (WED.), JULY 1, 1998

INDICATION OF MANAGEMENT FUNCTION ITEMS

VEHICLE CANNOT BE DELIVERED ON JULY 7TH (TUE.) BECAUSE OF THE FOLLOWING REASONS.

| CONTENTS OF ORDER | STATE OF RESERVATION OF INDIVIDUAL MANAGEMENT FUNCTION ITEM | |
|---|---|---|
| VEHICLE A | OK | TOTAL VEHICLES |
| 3000EFI24 | OK | JZS153-ATPQF2JZ |
| ROYAL SALOON | OK | 53)2JZ-GE |
| SILKY SHINE TONING | OK | GRADE Q |
| POWER MOONROOF | OK | 2BK |
| GPS VOICE NAVIGATION | OK | FAIRWAY 17 |
| COLD DISTRICT SPECIFICATIONS | OK | 15-INCH ALUMINUM WHEELS |
| | OK | MOONROOF |
| | NG | EMV NAVIGATION    SHORTAGE |
| | OK | COLD DISTRICT |

CHANGE OF SPECIFICATIONS    EXCHANGE PROCESS    OPTIONS

EXAMPLE STRUCTURE OF ORDERED INFORMATION

| | ORDERING INFORMATION | | | ORDER INFORMATION | | |
|---|---|---|---|---|---|---|
| ORDER No. | ORDERED DATE AND TIME | ORDER No. | DEALER INFORMATION | CUSTOMER INFORMATION | VEHICLE SPECIFICATION INFORMATION | PARTS INFORMATION | DESIRED DELIVERY DATE INFORMATION |

Fig. 7

EXAMPLE STRUCTURE OF PRODUCTION QUOTA DB

| PRODUCTION QUOTA INFORMATION | | ORDER No. | ORDERED VEHICLE OR POTENTIAL VEHICLE | VEHICLE SPECIFICATION INFORMATION | | | | | | | | DESIRED DELIVERY DATE (DESIGNATED DELIVERY DATE) | DEALER CODE | STANDBY |
|---|---|---|---|---|---|---|---|---|---|---|---|---|---|---|
| ID No. | DATE | QUOTA No. | | | VEHICLE NAME | GRADE | ENGINE TYPE | BODY COLOR | --- | OPTION | | | | | |
| | | | | | | | | | | ALUMINUM WHEEL | FOG LAMP | NAVI-GATION | --- | | | |

Fig. 8

EXAMPLE STRUCTURE OF PARTS PRODUCTION QUOTA (EACH PART)

| PARTS PRODUCTION QUOTA INFORMATION ||| PRODUCTION QUOTA ID No. | FOR ORDERED OR POTENTIAL VEHICLE | DEALER CODE | ---- |
|---|---|---|---|---|---|---|
| ID No. | DATE | QUOTA No. | | | | |

LIST OF ORDERS TO BE EXCHANGED

12:01, JULY 7, 1998

ORDERD VEHICLE

LIMITING CONDITIONS →

| DEALER CODE | SCHEDULED DELIVERY DATE | ORDER No. | VEHICLE NAME | ENGINE/ TRANSMISSION | GRADE | BODY COLOR | AT/MT |
|---|---|---|---|---|---|---|---|
|  |  |  |  |  |  |  |  |

PRINT    START REPLACING    RETURN

Fig. 11

ORDERED PRODUCT DELIVERY DATE MANAGEMENT SYSTEM FOR MANAGEMENT PRODUCT OR PART PRODUCTION SLOT EXCHANGE

BACKGROUND OF THE INVENTION

1. Field of the Invention

The present invention relates to an ordered product delivery date management system which predetermines production slots for the number of products producible in each operation day, and which allocates a production slots to an ordered product. More particularly, the present invention relates to an improvement of management of exchanging of production slots so as to enable delivery of an ordered product by a delivery date desired by a customer.

2. Description of the Related Art

Conventionally, an automobile production plant produces a wide variety of products on a single production line in order to enhance production efficiency and the like. Respective vehicles to be produced are allocated production slots determined for each operation day according to a production plan or the like. Each vehicle is produced with a plurality of parts such as an engine installed according to specifications, and may also incorporate optional products such as an air conditioner or car audio equipment when completed as a final product. The parts for the engine and the like are almost always commonly used in order to efficiently produce a large variety of vehicles. In other words, the same parts are used to produce different types of vehicles to efficiently produce a wide variety of products with a relatively lower production volume.

However, even if a production slot for a vehicle can be secured as described above, it is meaningless if the parts, such as optional products to be installed in the vehicle, are not provided in time. Such parts are also produced in a production plant in much the same way as the assembled vehicle is produced. For example, a production, sales, supply and demand system disclosed in Japanese Patent Application Laid-Open Publication No. Hei 4-145573 secures some objective systems as a final product as well as production slots for articles configuring the objective systems at the same time so to enable to immediately respond a recommended delivery date of the objective systems to a customer.

The automobile production plant generally adopts a custom manufacturing system which starts to produce a vehicle upon receiving an order from a dealer and a planned manufacturing system which produces vehicles in expectation of some orders from the viewpoint of sales strategies and the like independently of the presence or not of an actual order. Briefly, the custom manufacturing system includes procedures wherein a dealer adds information about its name and the like to vehicle information about a vehicle name, body color, options and the like related to an ordering vehicle and sends the information to a production plant. The production plant secures a production slot which the ordered vehicle can be produced according to the order information received from the dealer. A vehicle deliverable date determined in consideration of the operation day of the secured production slot is given to the dealer as a scheduled delivery date. The vehicle is then assembled in the secured production slot according to the vehicle information and delivered to the ordered dealer on the scheduled delivery date.

From the viewpoint of user satisfaction and manufacturer and dealer reliability, custom manufacturing systems face significant issues in order to deliver a vehicle as soon as possible after receiving an order from a customer and to respond to scheduled delivery date immediately. The following procedure is conventionally followed in an attempt to deliver a vehicle to a customer as soon as possible.

First, orders from a dealer to a production plant are roughly divided among ordered vehicles and potential vehicles. An ordered vehicle refers to a vehicle which is ordered upon actually receiving an order after contracting with a customer, while a potential vehicle refers to a vehicle not yet ordered by a customer. A dealer places an order for an ordered vehicle to the production plant with priority information to request production with a priority added to order information for ordered vehicles. Upon receiving the ordering information as ordered information from the dealer, the production plant secures the earliest production slot among free production slots in view of the ordered information if it has priority information. If no production slot is available, a production slot assigned to a potential vehicle having lower priority is transferred to the ordered vehicle and the potential vehicle is reallocated a later free production slot. Thus, the ordered vehicle is produced with priority and can be delivered by the designated delivery date.

As described above, conventionally a free production slot is retrieved, and if a free production slot is not available, a vehicle having higher priority is allocated a production slot assigned to a vehicle having lower priority so as to achieve early delivery. This procedure was made to immediately provide a reliable delivery date taking into consideration part production slots, thereby improving services to the user.

However, even though in the aforesaid procedure the ordered vehicle has precedence over potential vehicles, the scheduled delivery date provided to the customer might be the earliest in the production plant but not be a production slot before the delivery date desired by the customer.

Even when a the production slot for the vehicle can be secured, if the parts configuring the vehicle can not be procured by the secured date of the production slot, it is necessary to secure a production slot for the vehicle having a later operation day so as to comply with the operation slot of the parts. While the problem of parts shortage can be solved by maintaining a large inventory of parts, such a solution is not realistic.

SUMMARY OF THE INVENTION

The present invention was achieved to solve the problems described above. It is an object of the invention to provide an ordered product delivery date management system which enables delivery of a product on an exact delivery date desired by a user.

To achieve the aforesaid object, the ordered product delivery date management system of the invention is an ordered product delivery date management system which allocates production slots for the products producible in every operation day, allocates a production slot to an ordered product designated in received order information, and determines an operation day of the allocated production slot as a deliverable date, and which comprises a production slot database which stores assignment states of respective production slots; and a production management processing means which secures a production slot for the ordered product according to the desired delivery date designated in the order information based on the contents of the production slot database and stores identification information of the secured ordered product and the desired delivery date in correspondence with identification information of the secured production slot; wherein when no unassignment production slot is allocated is available prior to the desired delivery date designated in the order information, and, when a production slot is already secured up to the designated desired delivery date, an operation day of the secured production slot is earlier than the desired delivery date of the ordered product and there is an ordered product for which a production slot is newly securable before or on the same date of the desired delivery date of the ordered product, the production management processing means performs management of exchange for a production slot of a product to allocate the production slot secured for the product to the ordered product designated in the order information.

According to the present invention, the ordered product, for which the production slot is secured by performing the management of exchange of the production slot of the product, can be delivered by the desired delivery date, and the delivery of the other ordered product, which had its production slot exchanged for the former product, can also be delivered by its desired delivery date. Thus, a plurality of customers can be satisfied.

The ordered product delivery date management system also comprises a parts production slot database which stores assignment states of the production slot for each part wherein production slots for each part producible in an operation day are allocated for the respective parts; a parts information master database which stores the ordered product produced using the pertinent parts in correspondence with the respective parts; and an ordered product specifications information database which stores information concerning part required for producing the ordered product in correspondence with identification information of the ordered product; wherein, when the production slot for producing the ordered product can be secured before the desired delivery date designated in the order information but there is a part among the parts required for producing the ordered product for which a production slot cannot be secured to enable the delivery by the desired delivery date of the ordered product, the production management processing means performs the management of exchange of a production slot of a part so as to allocate a production slot of the part based on the contents of the parts production slot database.

Even when a conventional Art cannot deliver the product by the desired delivery date because production slots of the parts for the ordered product cannot be secured, the present invention can secure the ordered product and the production slots for all the parts used to produce the ordered product by. performing the management of exchange of the production slot of the pertinent part for which the production slot could not be secured. Accordingly, the ordered product can be delivered by the desired delivery date.

Where there is no free production slot before the desired delivery date designated in the order information, the production management processing means exchanges a production slot prior to the designated desired delivery date secured for a product having lower priority than the ordered product to use it for the ordered product.

According to the present invention, the production slot secured for the product having lower priority than the ordered product is exchanged for the ordered product. Therefore, a production ratio of the ordered products occupying the production slots can be improved.

Where there are a plurality of products for which exchangeable production slots are secured for the ordered product designated in the order information, the production management processing means sends information concerning the products for which exchangeable production slots are secured to an order information sending side so as to enable the selection of a product to be exchanged.

According to the present invention, the exchangeable products are transmitted to the order information sending side so as to enable the selection of the product to be exchanged. Therefore, the order information sending side can exchange slots for products which seem to be optimum.

BRIEF DESCRIPTION OF THE DRAWINGS

FIG. 3 is a diagram showing an example order reception screen of this invention;

FIG. 4 is a diagram showing an example delivery date response screen of this invention;

FIG. 5 is a diagram showing an example management function item indication screen of this invention;

FIG. 7 is a diagram showing an example of structure of the order information database of this invention;

FIG. 8 is a diagram showing an example of structure of the production slot database of this invention;

FIG. 11 is a diagram showing a list of orders to be exchanged.

DESCRIPTION OF THE PREFERRED EMBODIMENT

A preferred embodiments of the invention will be described with reference to the accompanying drawings.

Figure 1:
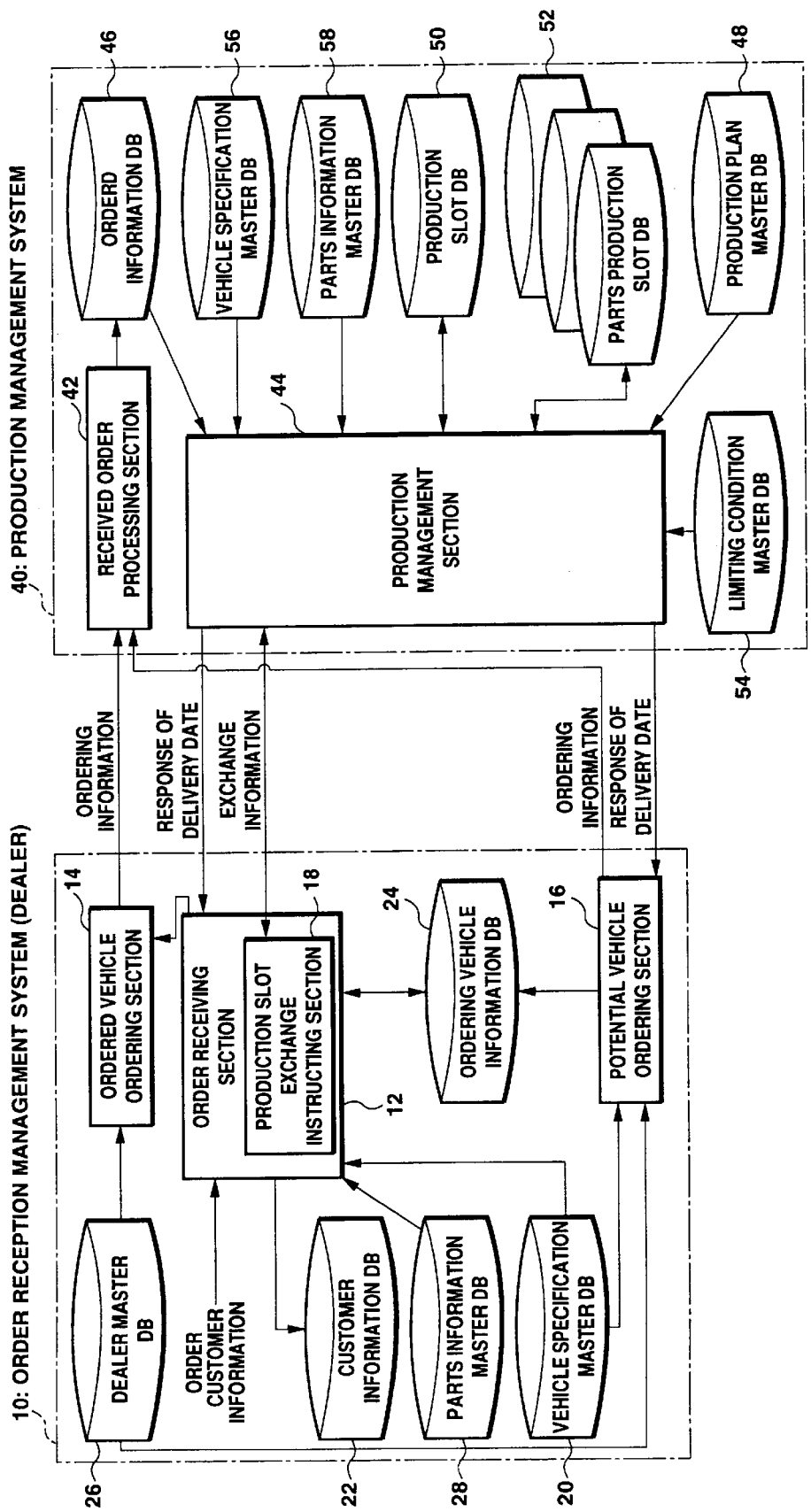
FIG. 1 is a functional block diagram of the ordered product delivery date management system according to the present invention.

FIG. 1 is a functional block diagram showing one embodiment of the ordered product delivery date management system according to the present invention. This embodiment will be described in connection with an example wherein a product to be sold to a customer is a vehicle and a delivery date of an ordered product, namely the vehicle that the customer has decided to purchase, is provided to the customer. The ordered vehicle is produced by adding options such as aluminum wheels, car audio equipment and other various accessories to the chassis of a vehicle, which is produced by assembling a car body, an engine, and other equipment and parts. All the equipment and accessories required to produce the vehicle according to an order are defined as parts in this embodiment.

FIG. 1 shows an order reception management system 10 installed in a dealer selling vehicles and a production management system 40 installed in a production plant for manufacturing vehicles according to orders from the dealer. The production management system 40 receives order information from the order reception management system 10 and replies by providing a delivery date of the ordered vehicle before beginning manufacture. The production plant is determined to adopt a custom-manufacturing method as well as a planned production method to manufacture vehicles.

This ordered product delivery date management system manages a plurality of dealers and a plurality of production plants. FIG. 1 shows only one dealer and one production plant for convenience of description. All dealers and production plants perform basically the same processing. A production reception management system is installed in a head office to integrally manage the order reception manage system 10 and the production management system 40 and to collectively control a master database which is shared by the respective systems. As, this management is not included in the features of this embodiment, it is not described in detail.

The order reception management system 10 of this embodiment has an order receiving section 12 for receiving orders from customers, an ordered vehicle ordering section 14 for ordering a customer-ordered vehicle from a dealer from the production plant, and a potential vehicle ordering section 16 for ordering a potential vehicle from the dealer. The order receiving section 12 includes a production slot exchange instructing section 18, which is a characteristic component of this embodiment, for instructing the exchange of a secured production slot. The order receiving section 12 produces ordering information of the basic specifications and options of the vehicle purchased by the customer on the basis of a vehicle specifications master database 20. The order receiving section 12 also stores customer information, which corresponds a customer code with the customer's address, name and the like, into a customer information database (DB) 22. After acknowledging a delivery date returned in response to the ordering information transmitted through the ordered vehicle ordering section 14, the order receiving section 12 also stores the information about the ordered vehicle in an ordered vehicle information database (DB) 24 and completes the order receiving process. The ordered vehicle ordering section 14 extracts information about the dealer from a dealer master database 26 and adds it to the order information from the order receiving section 12 to generates order information and transmits it to the production management system 40 of the plant. The potential vehicle ordering section 16 places an order for a vehicle not purchased by a customer. When the customer is not satisfied by the scheduled delivery date designated by the delivery date response, the production slot exchange instructing section 18 gives instructions according to the vehicle specifications master database 20, the parts information master database 28 or the ordered vehicle information DB 24 to a production management section 44, which mainly performs the management of exchange of the production slot, to change the scheduled delivery date to a date before the desired delivery date.

The production management system 40 includes a received order processing section 42 and the management controlling section 44. The received order processing section 42 stores the ordering information received from the dealer as ordered information into an ordered information database (DB) 46. To produce the ordered vehicle in a production slots previously determined for each operating day according to a production plan master DB 48, the production controlling section 44 refers to a production slot database (DB) 50 and a parts production slot database (DB) 52 to obtain a production slot and to provide a scheduled delivery date to the ordered dealer. The production management section 44 also refers to a vehicle specifications master DB 56 and a parts information master DB 58 according to predetermined limiting conditions specified in a limiting condition master DB 54 to cooperate with the production slot exchange instructions section 18 to perform the management of exchange of the production slot so as to assign a scheduled delivery date closer to the delivery date desired by the customer.

Next, the respective databases shown in FIG. 1 will be described.

The vehicle specifications master DB 20 shows all basic specifications, option information and their combinations of vehicles which can be ordered by the dealer. Specifically, a plurality of models are generally available for a vehicle, and the basic specifications, such as engine type, are determined according to model. Body and seat colors are also available in a plurality of numbers, among which color combinations which are available depending on the models are also registered in the vehicle specifications master DB 20. Accessories such as options which can be installed depending on the models are also available in a plurality of numbers. Furthermore, an option such as car audio equipment may be selected from the products available from a plurality of manufacturers. Thus, all combinable and selectable specifications are stored in the vehicle specifications master DB 20. The vehicle specifications master DB 56 is the same as the vehicle specifications master DB 20.

The same information as in the vehicle specifications master DB 20 is basically stored in the parts information master DB 28 and is also resistered in the parts information master DB 28 that which parts are used or candidates to be used for producing which vehicles. Specifically, the parts include those such as a spoiler specially designed for particular vehicles and common parts such as car audio equipment commonly used for vehicle types having a plurality of models. And, information such as a vehicle code, which specifies a vehicle on which such parts are installed or may be installed in correspondence with the part codes of such parts, is determined in the parts information master DB 28. The parts information master DB 58 is the same as the parts information master DB 28.

The dealer master 26 includes all information concerning the respective dealers. Specifically, the business days of the dealers, the number of orderable potential vehicles, the number of exchangeable times of production slots and the like are resistered in correspondence with dealer codes for identifying the dealers.

A limiting condition master DB 54 has one or more limiting conditions for exchanging by the management of exchange. Specifically, if no free production slot is available within the operating days before the delivery date desired by the customer, this embodiment exchanges a production slot already allocated for another vehicle to use it for the vehicle ordered by the customer. The limiting condition master DB 54 determines conditions and procedures for managing and securing a production slot for the ordered vehicle. A free production slot refers to a production slot which is not allocated to any vehicle or part.

The production plan master DB 48 includes information required for production of vehicles in the plant. For example, the information includes the operating days, the number of production slots in the respective operation days, the number of maximum production slots which may be secured for potential vehicles per operating day, and the like.

The customer information database (DB) 22 is a database for storing information concerning customers who are considering or have decided to buy a vehicle and have visited a dealer. This customer information includes customer addresses, names, mail addresses, family structures, vehicle purchase records, identification photographs and the like, with which customer codes originally allocated to the customers by the dealer in the entire system are corresponded.

The ordering vehicle information database (DB) 24 is a database for storing information concerning potential vehicles and ordered vehicles with their specifications and scheduled delivery dates decided in the respective dealers. The each vehicle information includes the models, model types, options and others in correspondence with the vehicle codes, required for the management of exchange of the production slot to be described afterward. The other databases 46, 50, 52 will be described below.

Now, process from the decision by the customer to purchase the vehicle to the response of the scheduled delivery date of the ordered vehicle will be described. Because the vehicle produced in the production plant is inspected and transported before it is delivered to the customer, a production date in the secured production slot (production slot date) and a deliverable date, namely a scheduled delivery date, actually differ by several days. However, for convenience of description, the production slot date and the scheduled delivery date are defined as the same date in the following description.

Figure 2:
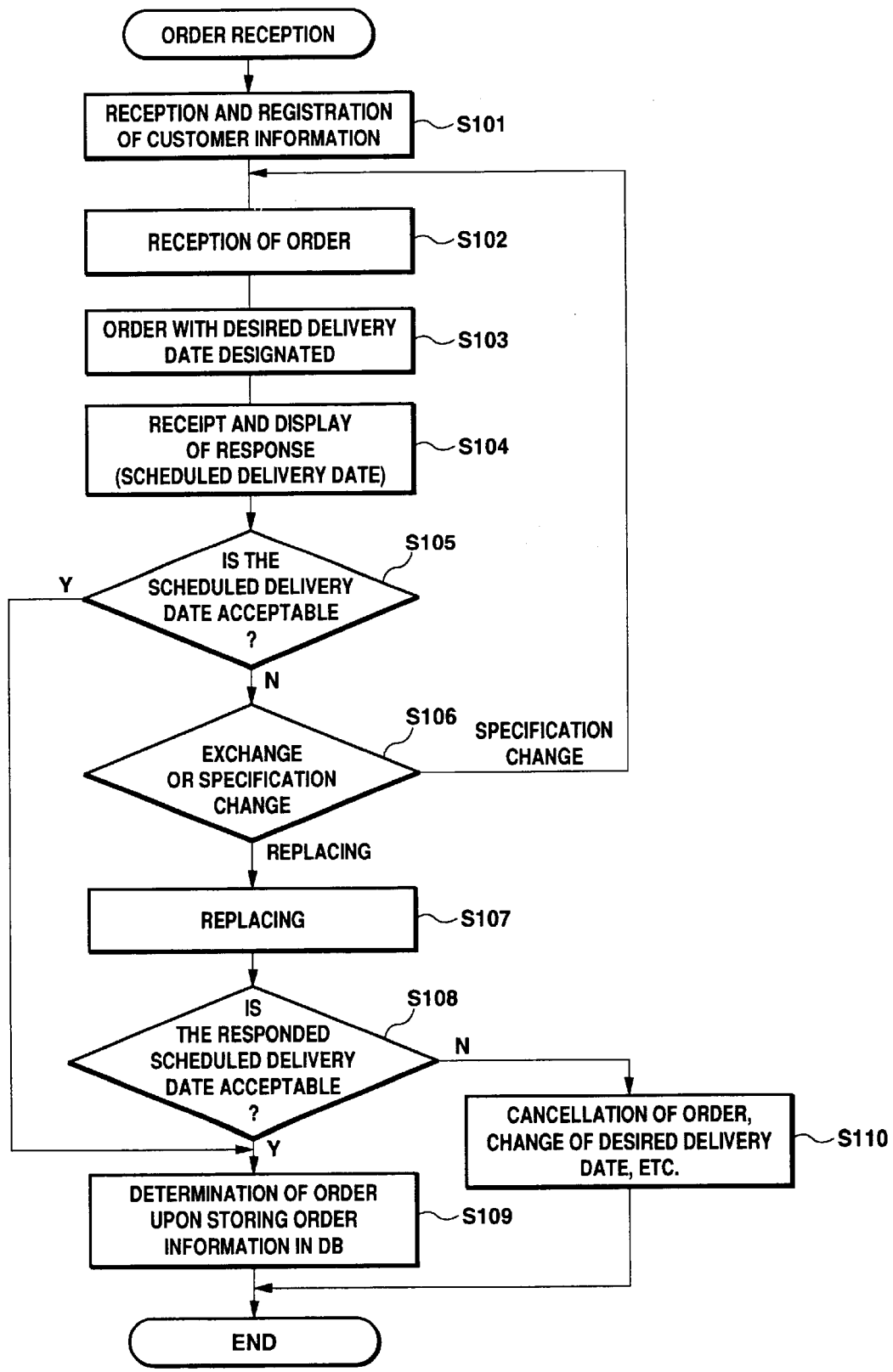
FIG. 2 is a flowchart showing an order receiving process by an order reception management system of this invention.

Next, ordering processing in the dealer of the ordered vehicle which the customer has decided to buy will be described with reference to the flowchart shown in FIG. 2.

The order receiving section 12 stores customer information about a customer who has decided to purchase a vehicle, which is entered through a customer information input screen not shown, into the customer information DB 22 (step 101) and also receives the specifications of the ordered vehicle entered through the order reception screen (step 102). FIG. 3 shows an example order reception screen. When a vehicle is entered the vehicle name input field, the order receiving section 12 displays the selectable engines, transmissions, models, body colors, and options in respective areas according to the vehicle specifications master DB 20 and the parts information master DB 28. The customer selects desired options from to determine the specifications of the vehicle. In this case, a vehicle type which is selected for the "ordered vehicle" and the desired delivery date and others of the ordered vehicle are designated through the screen. After determining necessary items as above, a "delivery date response" button is clicked to send the entered information as order information to the ordered-vehicle ordering section 14. The ordered-vehicle ordering section 14 adds the dealer information for specifying the dealer to the received order information to produce ordering information and transmits it to the production management system 40 of the production plant where the ordered vehicle type is produced (step 103). Upon completing the ordering process, the dealer is in a position of waiting to receive a delivery date response from the production plant.

Upon receiving the delivery date (scheduled delivery date) response from the production plant, the order receiving section 12 displays the scheduled delivery date (step 104). When the scheduled delivery date meets the desired delivery date, the scheduled delivery date and the specifications of the ordered vehicle are displayed on a delivery date response screen as shown in FIG. 4. Next, an order processing button is selected to confirm the order and the order information is then stored in the ordering vehicle information DB 24 (steps 105, 109). If the scheduled delivery date is later than the desired delivery date, the customer is prompted to designate the customer's preference on a management function item indication screen shown in FIG. 5. This screen displays the contents of the order of the ordered vehicle and whether or not the basic parts, options, and the like required for the production of the ordered vehicle can be procured to deliver the vehicle on the desired delivery date. Such information is sent together with the scheduled delivery date from the production management system 40 in step 104. This screen shows an example in which the desired delivery date cannot be met because an optional part, a navigation system "EMV Navi", cannot be procured. Therefore, the customer can see from the information that the customer must give up the navigation system to satisfy the desired delivery date. Otherwise, the customer may change its manufacturer from company A to company B. To do so, the specifications change button is selected to display the order reception screen to change the order (step 106). If the customer wants to keep the original order without changing it, an exchange button is selected to perform the management of exchange which is a feature of this embodiment (step 107). Details of the management of exchange will be described later in this specification. When the management of exchange results in enabling the delivery of the vehicle by the desired delivery date, the same procedure as step 106 is executed to confirm the order (steps 108, 109). If it is impossible to deliver the vehicle with the ordered specifications by the desired delivery date despite the exchange, measures are taken by canceling the order, delaying the desired delivery date or changing the ordered specifications (step 110). For reference, the scheduled delivery date may be displayed on the management function item indication screen so to suggest how long the desired delivery date must be postponed.

Now, procedures to secure the production slot according to the order information received by the production management system 40 and to respond the scheduled delivery date will be described with reference to the flowchart shown in FIG. 6.

Upon receiving the order information sent from the dealer, the received order processing section 42 adds to it the ordered date and time and an identifiable order number (order No.) and stores this ordered information in the ordered information DB 46 (step 201). An example structure of the ordered information DB 46 is shown in FIG. 7. Then, the production management section 44 obtains a production slot for producing the ordered vehicle according to the order information received (step 202). The production slot is obtained as follows with reference to the production slot DB 50 and the parts production slot DB 52. The production slot of this embodiment is obtained by advancing in order to improve production efficiency. The production slot of the potential vehicle is obtained from free production slots according to the conditions stored in the production plan master DB 48.

FIG. 8 is a diagram showing an example structure of the production slot DB 50 of this embodiment. The production slot DB 50 is used to ascertain and manage the state of use of the production slots. Each production slot can be uniquely specified according to operation day and slot number and can be assigned an ID No. for the sake of convenience. Each production slot information block comprises order No. corresponding to the vehicle produced in the production slot, flag information whether the vehicle is an ordered vehicle or a potential vehicle, vehicle specifications information contained in ordering information, a desired delivery date (designated delivery date) of the vehicle, an ordering dealer code and a standby flag stored in a related state. The attainment of the production slot or not can be judged according to the presence or not of setting of information such as order No. Standby flag information is set in correspondence with a vehicle desired to be delivered as soon as possible (hereinafter called the ASAP vehicle) and indicates that if a production slot earlier than the own production slot secured is canceled, the canceled production slot shall be secured for the ASAP vehicle.

Figures 9, 10:
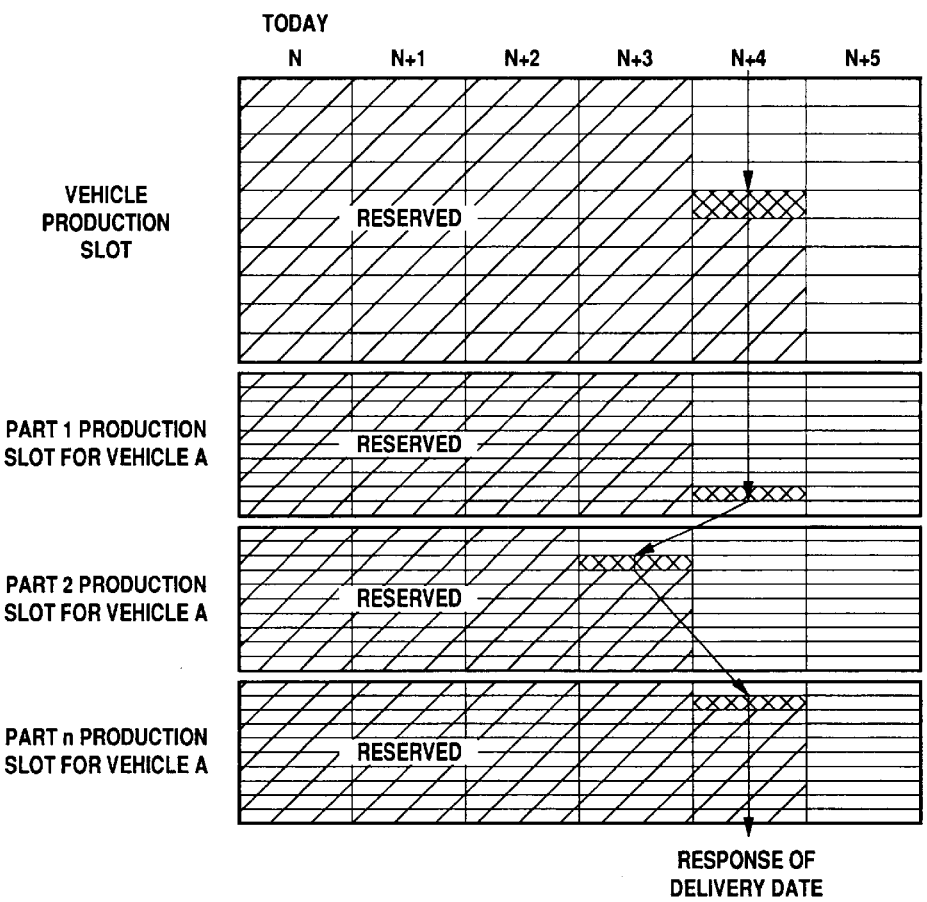
FIG. 9 is a diagram showing an example of structure of the parts production slot database of this invention.
FIG. 10 is a schematic diagram showing a process of obtaining the production slot.

FIG. 9 is a diagram showing an example structure of the parts production slot DB 52 of this embodiment. The parts production slot DB 52 manages the production slot for each part to be produced and can grasp to control a state of use of the production slot of each part. The production slot of each part can be uniquely identified by its operating date and slot number, and is assigned ID No. for the sake of convenience in this embodiment. The each production slot information stores therein in a related state a production slot ID No. secured for producing a vehicle having the parts produced in the pertinent production slot, flag information about whether the pertinent vehicle is an ordered vehicle or a potential vehicle and the dealer code of the dealer having ordered the vehicle on which the above parts are installed. It can be judged whether the part production slot is secured or not according to the presence or not of setting of information about production slot ID No. of the vehicle.

FIG. 10 is a schematic diagram showing production slots of a vehicle and parts to describe a method of obtaining the production slots. The number of production slots in each operation day is determined by the production plan master DB 48. In practice, the number of potential vehicles and ASAP vehicles and the number of production slots which can be secured by a single dealer in each operation day are determined, but such conditions are not taken into consideration in this embodiment.

First, the production management section 44 retrieves the production slot DB 50 to obtain a free production slot for producing a vehicle. FIG. 10 shows that the production slot obtained is the fourth day from today. When this obtained production slot day is earlier than or same to the desired delivery date (step 203), it is judged that the customer's desire is satisfied. Whether or not the vehicle can be actually produced in the obtained production slot is then verified. Specifically, whether all the parts to be installed in the vehicle can be manufactured and procured before the production of the vehicle is started in the obtained production slot (step 204) and whether the production slots for all the pertinent parts can be secured by the date and time of the production slot of the vehicle based on the production slot DB 50 and the parts production slot DB 52 is verified. When it is determined that all parts can be procured by the production slot of the vehicle as shown in FIG. 10, it is judged that the vehicle ordered by the customer can be produced in the production slot obtained for the vehicle, and that production slot day is communicated to the dealer as the scheduled delivery date (step 216). As described above, to produce the vehicle in the obtained production slot of the vehicle, it is necessary to judge in the strict sense whether the parts can be procured on the basis of time which is obtained by subtracting a transportation time or the like of the parts set in the part information master DB 58 from the date and time of the secured production slot of the vehicle. The possibility of procuring the, parts is judged in this embodiment by merely comparing the production slot days of the vehicle and the parts for the sake of simplification of the description.

The acquisition and securing of the production slots by the above processing are to provisionally reserve (provisionally secure) them, and the production slots for the vehicle and the parts are formally secured upon confirmation by communication the delivery date to the dealer and receiving from the dealer an order with the responded delivery date. In this example, however, for the sake of simplification of the description, the provisional reservation is assumed to be the actual securing of the production slot and the actual securing processing is omitted.

As described above, it is first judged whether the vehicle can be delivered by the desired delivery date by checking the availability of a free production slot. The aforesaid process is performed on all the free production slots up to the desired delivery date (step 205). When it is found that the vehicle cannot be delivered by the desired delivery date when the process is limited to only free production slots, the dealer is informed that the vehicle cannot be delivered on the desired delivery date and the reasons (a list of parts which cannot be procured and the like) and also asked whether the dealer desires the management of exchange (step 206). The state of the system in the dealer at this time is shown in the example screen of FIG. 5. Upon receiving the instructions about the management of exchange from the dealer, the production management section 44 performs the management of exchange by the following procedure.

First, the production management section 44 retrieves the production slot DB 50 for only the production slot secured for the potential vehicle. When the retrieved production slot is earlier than or same as the desired delivery date (step 208), it is checked whether production slots can be secured for all the parts to be installed in the ordered vehicle so to see whether the ordered vehicle for which the production slot is to be obtained can be produced actually (step 209). This step may be the same as step 204. When it is determined that all the necessary production slots including those for the parts can be secured, the vehicle can be delivered by the desired delivery date by taking over the production slot of the potential vehicle. Therefore, the production slot of the potential vehicle is exchanged (step 210). The production slot for the potential vehicle is secured by sequentially pushing back the production slots among the potential vehicles for which the production slots have been secured or by newly acquiring a free production slot. The production management section 44 updates the production slot DB 50 and the parts production slot DB 52 in accordance with the management of exchange.

Thus, when the scheduled delivery date meeting the desired delivery date can be secured, the production slot date is responded as the scheduled delivery date to the dealer (step 216). When the production slot of the potential vehicle can be exchanged, a production ratio of the ordered vehicles can be improved. The aforesaid processing is performed on the production slots of all the potential vehicles up to the desired delivery date (step 211), and, when it is found that the vehicle cannot be delivered by the desired delivery date when the process is performed on only the free production slots and the production slots for the potential vehicles, the management of exchange is also performed on the ordered vehicles. This processing is included in the features of this embodiment.

In step 212, the production management section 44 retrieves the production slot DB 50 for only the production slots secured for the ordered vehicles. When there is an ordered vehicle (also called "exchange candidate vehicle") having secured the same or earlier date than the desired delivery date of a newly ordered vehicle (also called "production slot requiring vehicle") for which a production slot is to be acquired, the production slot day of the exchange candidate vehicle is compared with the desired delivery date of the exchange candidate vehicle. When the production slot date secured for the exchange candidate vehicle is earlier than the desired delivery date of the exchange candidate vehicle and the exchange candidate vehicle can newly secure a production slot date earlier than or same to the desired delivery date of the own vehicle, the production slot date of the exchange candidate vehicle can be postponed provided that the parts can be procured without violating the desire of the customer ordering the exchange candidate vehicle.

Further, when all the parts for the production slot requiring vehicle can be procured by the production slot date to be exchanged (step 213) in the same way as steps 204, 209, the production slot for the exchange candidate vehicle specified by the aforesaid process is exchanged for the production slot requiring vehicle (step 214). According to the above exchange, the contents of the production slot requiring vehicle and the exchange candidate vehicle stored in the production slot DB 50 and the parts production slot DB 52 are updated.

Thus, when a scheduled delivery date satisfying the desired delivery date can be secured, this production slot date is responded as the scheduled delivery date to the dealer (step 216). Meanwhile, when the aforesaid process is performed on all the production slots of the exchange candidate vehicles up to the desired delivery date (step 215) and the delivery cannot be made by the desired delivery date, a response that the vehicle cannot be delivered on the desired delivery date is sent in place of a scheduled delivery date (step 216). The system may be configured to acquire the earliest scheduled delivery date for the production slot requiring vehicle and to respond that the desired delivery date cannot be satisfied but that the earliest scheduled delivery date has been acquired.

As described above, when a new production slot is allocated for the ordered vehicle, a free production slot and the production slot secured for the potential vehicle having a lower precedence than the ordered vehicle are subjected to the management of exchange in this embodiment, and the production slot secured for the ordered vehicle satisfying predetermined conditions can also be subjected to the management of exchange. Predetermined conditions refers to, as described above, that when the production slot date secured for the ordered vehicle (exchange candidate vehicle) and its desired delivery date are compared and the production slot date is prior to or the same as the desired delivery date and, even after the management of exchange, a newly obtaining production slot date is earlier than the desired delivery date. An orderer of the exchanged ordered vehicle (production slot requiring vehicle) and an orderer of the exchanged ordered vehicle (exchange candidate vehicle) receive the respective vehicles by the desired delivery date. Therefore, from the viewpoint of a service to deliver the vehicle by the date desired by the customer, a plurality of customers can be satisfied by performing the management of exchange of this embodiment and a scheduled delivery date can also be immediately provided.

In the aforesaid description, only the production slot of the vehicle was subjected to the management of exchange for the sake of simplification. However, management of exchange can be also performed for parts as well as on the vehicle as a whole. Specifically, it is judged in steps 204, 209, 213 whether all the parts can be procured by retrieving the parts production slot DB 52. If there is any part which cannot be secured by the production slot date of the vehicle, the production slot of the part may be exchanged in the same way as described above. For example, where the desired delivery date cannot be satisfied because the production slot of the part, "EMV Navi", cannot be obtained as shown in FIG. 5, the pertinent part may be transferred from the potential vehicle or exchange candidate vehicle on which the same part is to be installed, so that the desire of the customer to buy the vehicle shown in FIG. 5 maybe satisfied. Thus, a delayed delivery or a cancelled order resulting from a shortage of parts can be avoided. Halting production or postponing a scheduled delivery date of a potential vehicle by several days to satisfy the desired delivery date of the customer does not result in any disadvantage from the viewpoint of a service.

Figure 6:
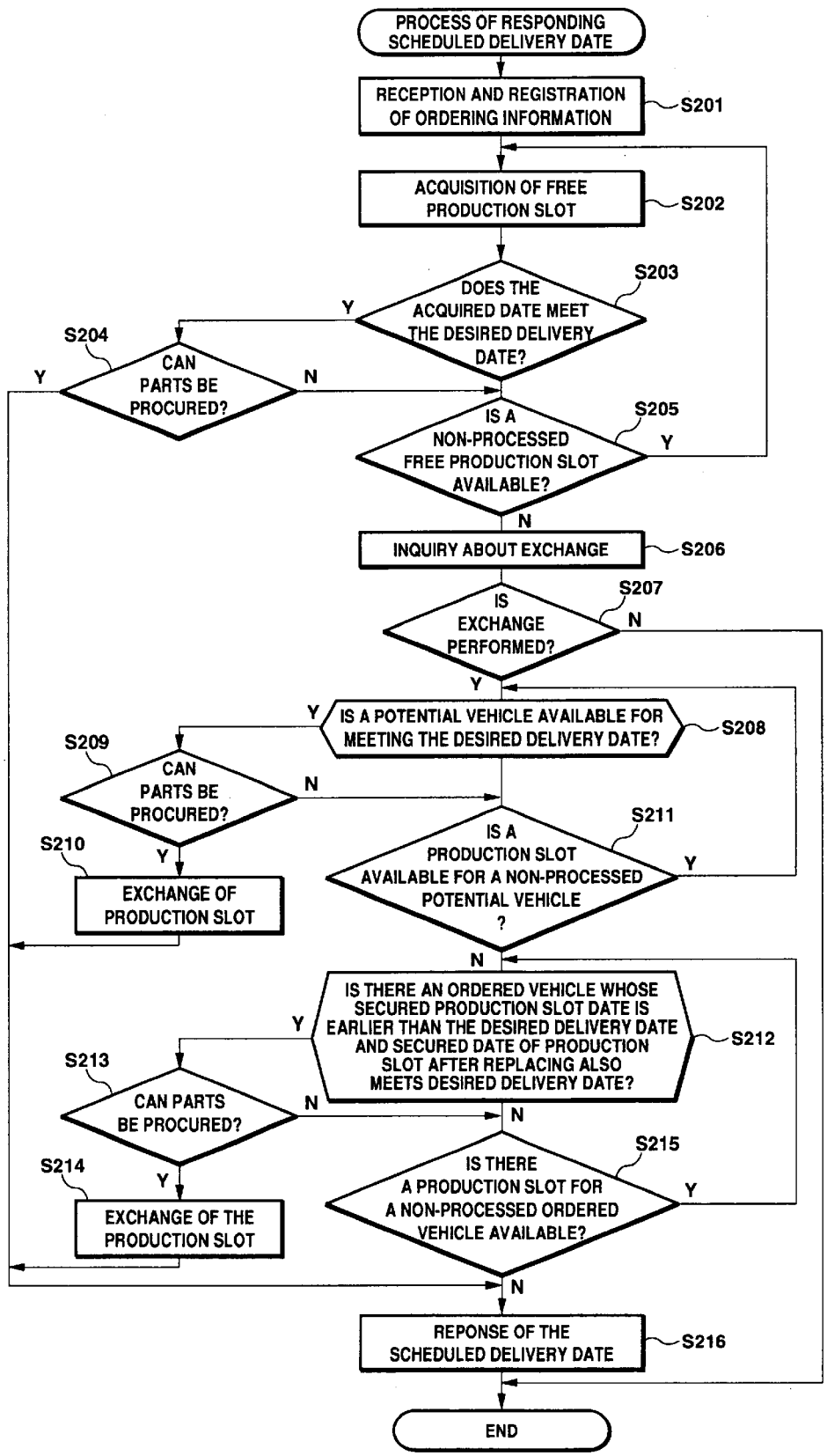
FIG. 6 is a flowchart showing a delivery date answering process of the production management system of this invention.

With the scheduled delivery date-responding procedure shown in FIG. 6 according to the present invention, the production slots secured for the potential vehicle and the ordered vehicle in this order are subjected to management of exchange, and, when the production slot satisfying the desired delivery date can be secured, the exchange of the production slot at that time is performed, and it is responded as the scheduled delivery date of the ordered vehicle. The contents of the management of exchange comply with the conditions and procedure stored in the limiting condition master DB 54 and enable to realize various types of exchanging methods. For example, to perform the management of exchange, a condition to exchange only the production slots secured by the dealer may be added. To exchange the common parts for a plurality of vehicle types, only the same vehicle types as the ordered vehicle to be exchanged may be subjected to the exchange. Even when the production slot satisfying the desired delivery date is secured as described above, it is not given as the scheduled delivery date, but instead a list of all the production slots of potential vehicles/ordered vehicles which can be exchanged up to the desired delivery date is prepared or such a list of the production slots may be prepared irrespective of the potential vehicles and ordered vehicles, so that the dealer can select a production slot of a vehicle to be exchanged. Specifically, when parts can be procured in steps 209, 213, the exchange of the pertinent production slot (steps 210, 214) is not performed immediately, but the production slots are temporarily reserved as selection candidates. The selection candidates reserved are communicated instead of the scheduled delivery date in step 216. An example screen of this case is shown in FIG. 11. Thus, a list of information about dealer codes, vehicle names and others for each vehicle subjected to the exchange is shown on the screen. A sales person may select a vehicle subjected to the exchange from the list to give instructions to perform the exchange. Thus, selection from the list is convenient in the following cases.

For example, when an ordered vehicle for which a production slot has been secured is designated to be delivered on a birthday, a system which secures the production slot by advancing might secure a scheduled delivery date earlier than the designated delivery date. If this ordered vehicle is transported to the dealer earlier than expected, the dealer must keep it for some time because the vehicle cannot be delivered to the customer until the birthday. In this case, the ordered vehicle, which is designated to be delivered on the birthday, may be subjected to the exchange with higher priority. Thus, the desire of the customer for the production slot requiring vehicle can be met, and the dealer need not need to store the ordered vehicle for a long period.

In this embodiment, the vehicles ordered by the dealer were classified into the ordered vehicles having the customers and the potential vehicles without a customer to give priority to the vehicle subjected to the exchange of the production slot. But the priority of the vehicle for which the production slot is secured may be divided into multiple stages.

In this embodiment, the production plant described has a custom manufacturing system and a planned manufacturing system. When the management of exchange of the potential vehicle in step 208 through step 211 is omitted, the present invention can also be applied to a production plant employing the custom manufacturing system only.

The vehicles produced in the above embodiment have a large number of basic parts and options, and each option has a plurality of alternatives. According to the specifications of a vehicle designated by the order reception process, order information including the parts required for the production of the vehicle is generated. However, when a vehicle for which parts to be used are uniquely decided by designating is produced, parts information to be included in the order information may be previously provided as a master in correspondence with the products. The above embodiment was described with reference to the vehicles when the volume of production was relatively low and there were a wide variety of products to be produced. However, the invention can be applied to any products where they are produced upon receiving an order.

While there has been described that what is at present considered to be a preferred embodiment of the invention, it is to be understood that various modifications may be made thereto, and it is intended that the appended claims cover all such modifications as fall within the true spirit and scope of the invention.

What is claimed is:

1. An ordered product delivery date management system which allocates production slots for the products producible in each operation day, allocates a production slot to an ordered product designated in received order information, and determines the operation day of the allocated production slot as a deliverable date, comprising:

a production slot database which stores assignment states of respective production slots;

a parts production slot database which stores assignment states of the production slot for each part wherein production slots for each part producible in an operation day are allocated for the respective parts;

a parts information master database which stores data on an ordered product, production of which requires a pertinent part, in correspondence with the respective part;

an ordered product specification information database which stores information concerning a part required for producing the ordered product in correspondence with identification information of the ordered product; and a production management processing means which secures a production slot for the ordered product in time for the desired delivery date designated in the order information based on the contents of the production slot database, and which stores identification information of the secured ordered product and the desired delivery date in correspondence with identification information of the secured production slot; wherein, when no unassigned production slot is available prior to the desired delivery date designated in the order information, and when a production slot is already secured by another ordered product up to the designated desired delivery date, and when an operation day of the secured production slot secured by said other ordered product is earlier than the desired delivery date of the ordered product and there is another newly securable production slot for said other ordered product before or on the same date of the desired delivery date of said other ordered product, the production management processing means performs management of exchange for the production slot of the other ordered product so as to allocate the production slot secured for the other ordered product to the ordered product designated in the order information; and wherein, when the production slot for producing the ordered product can be secured before the desired delivery date designated in the order information, but a production slot for the part cannot be secured to enable the delivery by the desired delivery date, the production management processing means performs management of exchange of the production slot of another part so as to allocate the production slot for said other part to the part required for producing the ordered product based on the contents of the parts production slot database.

2. The ordered product delivery date management system according to claim 1, wherein, when there exist a plurality of products for which exchangeable production slots are available for the ordered product designated in the order information, the production management processing means sends information concerning the products for which exchangeable production slots are secured to an order information sending side so as to allow the selection of a product to be exchanged.

3. An ordered product delivery date management system which allocates production slots for the products producible in each operation day, allocates a production slot to an ordered product designated in received order information, and determines the operation day of the allocated production slot as a deliverable date, comprising:

a production slot database which stores assignment states of respective production slots; and a production management processing means which secures a production slot for the ordered product in time for the desired delivery date designated in the order information based on the contents of the production slot database, and which stores identification information of the secured ordered product and the desired delivery date in correspondence with identification information of the secured production slot; wherein, when no unassigned production slot is available prior to the desired delivery date designated in the order information, and when a production slot is already secured by another ordered product up to the designated desired delivery date, and when an operation day of the secured production slot secured by said other ordered product is earlier than the desired delivery date of the ordered product and there is another newly securable production slot for said other ordered product before or on the same date of the desired delivery date of said other ordered product, the production management processing means exchanges the production slot secured for the other ordered product so as to allocate the production slot for said other ordered product to the ordered product for use in producing the ordered product, said other ordered product having a lower priority than the ordered product.

4. The ordered product delivery date management system according to claim 3, wherein, when there exist a plurality of products for which exchangeable production slots are available for the ordered product designated in the order information, the production management processing means sends information concerning the products for which exchangeable production slots are secured to an order information sending side so as to allow the selection of a product to be exchanged.

* * * * *